United States Patent [19]

Harrison et al.

[11] Patent Number: 4,626,122

[45] Date of Patent: Dec. 2, 1986

[54] CONNECTOR

[75] Inventors: Brian Harrison, Nepean; Ronald E. Davis, Kanata, both of Canada

[73] Assignee: Her Majesty the Queen in Right of Canada represented by Minister of National Defence, Ottawa, Canada

[21] Appl. No.: 746,861

[22] Filed: Jun. 20, 1985

[30] Foreign Application Priority Data

Oct. 29, 1984 [CA] Canada .................................. 466550

[51] Int. Cl.$^4$ ........................ F16B 7/10; F16C 11/00
[52] U.S. Cl. ...................................... 403/51; 403/134
[58] Field of Search ............................ 403/134, 50, 51

[56] References Cited

U.S. PATENT DOCUMENTS 3,208,290 9/1965 Mathues et al. ................ 403/134 X
3,506,289 4/1970 Gottschald ............................ 403/51

FOREIGN PATENT DOCUMENTS 1194397 5/1959 France .

Primary Examiner—Andrew V. Kundrat
Attorney, Agent, or Firm—Cushman, Darby & Cushman

[57] ABSTRACT

A system for connecting an annular, rigid component to an opening in a flexible sheet material is disclosed. The system includes a boss molded around the opening in the sheet material and a groove around the component, sized to accommodate the boss. An annular keeper engages the boss circumferentially under hoop stress and compresses the boss against the component. A ledge on the component engages the keeper to retain it in operating position. In preferred embodiments, installation is assisted with a tapered face leading to the ledge, to produce elastic deformation of the keeper to the extent that it will pass over the boss and then snap back once past the ledge.

5 Claims, 5 Drawing Figures

CONNECTOR

FIELD OF THE INVENTION

The present invention relates to the secure and leakproof connection of annular rigid components to openings in flexible sheet materials or the like. The components may be used, for example, as a mount for the components of a gas mask, e.g. a breathing valve, eyepiece or filter canister. Other applications are in inflatable life jackets and boats and in flexible or collapsible containers.

BACKGROUND

The current technique for connecting annular rigid components of flexible sheets to provide the desired sealing and strength characteristics requires the molding of a tubular sleeve into the sheet around the opening. The annular component is placed in the sleeve and the sleeve is compressed against the outside of the component with a wire wrapping or a metal band clamp. This system is not entirely satisfactory. Wire wrapping requires considerable skill and care to install properly. With a band clamp, there is a gap at the band ends that is a discontinuity in the circumferential compression of the tube and thus a possible source of leakage. It is also necessary to cover the band ends to prevent damage to the sheet material.

SUMMARY OF THE INVENTION

The present invention aims at the provision of an improved component connecting system that is simple and rugged and less subject to failure through human error in installation.

According to the present invention there is provided a system for connecting an annular, rigid component to an opening in a flexible sheet material, comprising:

(a) a boss molded around the opening in the sheet material;

(b) a groove around the component to accommodate the boss;

(c) an anular keeper adapted to engage the boss circumferentially under hoop stress so as to compress the boss against the component; and (d) a ledge on the component for engaging the annular keeper to retain the keeper in compressing relation on the boss.

In use, it is relatively easy to locate the boss in the groove in the component. The annular keeper, when installed, secures the boss in the groove and compresses an annular band around the boss under uniform compression. The connection is resistant to rough handling while insuring a leak proof joint.

In preferred embodiments, the component has a tapered annular surface adjacent the ledge over which the annular keeper can be pressed during installation. Once the keeper has passed the ledge, it will relax onto the boss to compress the boss onto the component.

In most embodiments the groove will be formed on the external surface of the annular component. It is however, possible to provide an alternative arrangement with an internal groove.

The preferred keeper is metal as this provides a very secure and virtually permanent installation. The component may be metal or a plastic material according to the requirements of the particular application.

BRIEF DESCRIPTION OF THE DRAWINGS

In the accompanying drawings, which illustrate to prior art systems and an exemplary embodiment of the present invention.

DETAILED DESCRIPTION

Figure 1:
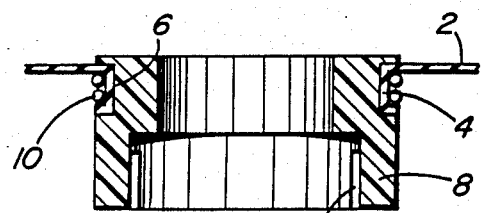
FIG. 1 is a diametral cross section of one prior art system.

Referring to the accompanying drawings, FIG. 1, illustrates a prior art connecting system in which a wire wrapping is used to secure an annular component to a flexible sheet material. As illustrated in that Figure, a flexible sheet material is formed with a tubular sheet 4, around an opening 6 in the material. A rigid annular annular component 8 is located in the tube 4 and a wrapping of soft wire 10 is wound around the tube 4 to compress it onto the component. The illustrated component 8 is internally threaded at 12 to serve as a mount for a gas mask canister.

The system illustrated in FIG. 1, is difficult to install satisfactorily. The wire wrapping must be wound, twisted, flattened and eventually covered with protective tape to provide not only a continuous compression of the tube 4 against the component 8 but also a sufficiently robust mechanical connection between the tube and the component.

Figure 2:
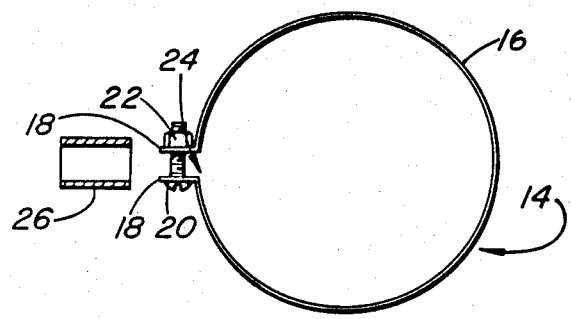
FIG. 2 is a plan view of a prior art band clamp.

FIG. 2 illustrates a metal band clamp 14 that is sometimes used in place of the wire wrapping 10 of the FIG. 1 system. The clamp 14 consists of a metal band 16 formed into a circular shape with two ends 18 bent outwards and joined by a machine screw and a nut 22. In use, the band clamp is placed over the tube 4 in place of the wire wrapping and tightened in place by turning the screw 20 in the nut 22. As will be apparent this leaves a gap in the band of compression on the tube at the point 24 where the two ends of the band are spaced apart. The connecting system is prone to leakage at this point. Because the band ends 18 and the screw 22 and nut 20 are, when exposed, likely to damage the sheet material 2, a sleeve 26 of rubber or the like material is installed over that part of the clamp for protective purposes.

Figure 3:
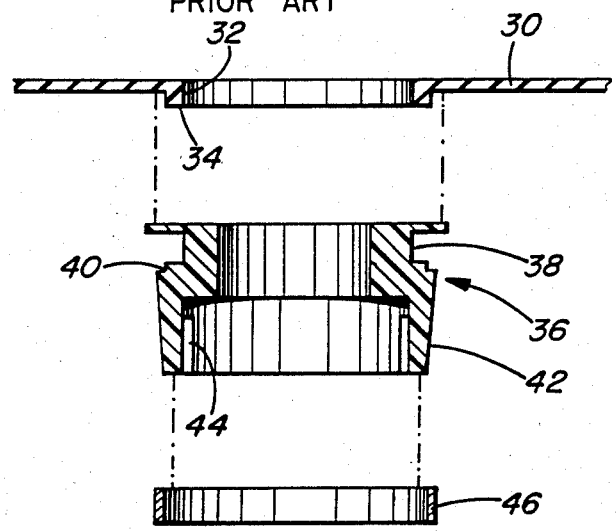
FIG. 3 is an exploded view in axial suction of a connecting system according to the present invention.

Turning now to FIG. 3 of the accompanying drawings, there is illustrated an embodiment of the present invention showing the components of the system before assembling. The sheet material has a circular opening 32 surrounded by an annular boss 34. The annular rigid component 36 to be secured to the sheet material 39 has an annular groove 38 in an external surface that is of substantially the same dimensions as the boss 34 so as to accommodate the base with a snug fit. Adjacent the groove 38 and facing towards it is a ledge 40 formed by a shallow step in the outer surface of the component 36. An annular tapered surface 42 widens from the end of the component 36 to the ledge 40. As with the component illustrated in FIG. 1, the component 36 is internally threaded at 44 to accommodate a gas mask canister. The remaining element of the system illustrated in FIG. 3 is an annular keeper 46 that has an internal diameter slightly less than the maximum diameter of tapered surface 42 and less than the outside diameter of the boss 34. The difference between the axial length of the keeper 46 and the spacing between the ledge 49 and the opposing face of the groove 38 is slightly less than the thickness of the sheet material 30. The effect of this will be described in connection with FIG. 5.

Figure 4:
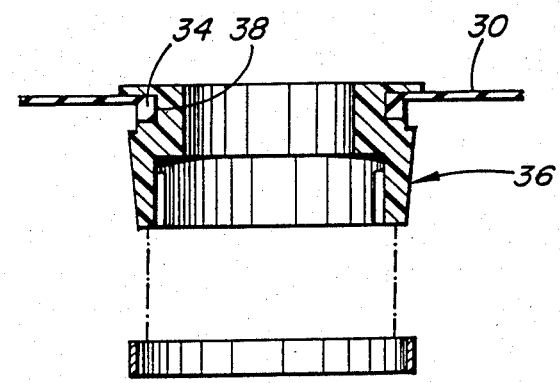
FIG. 4 is a view of the connecting system of FIG. 3, partially assembled.

FIG. 4 of the accompanying drawings illustrates the system of FIG. 3 partially installed. In FIG. 4, the component 36 has been assembled with the sheet material 30. The boss 38 of the sheet material has been seated fully within the groove 38. Because of the relatively stiff nature and fixed dimensions of the boss 34 when compared with the flexible tube used in the prior art system of FIGS. 1 and 2, location of the boss in the groove 38 is relatively easily and accurately done.

Figure 5:
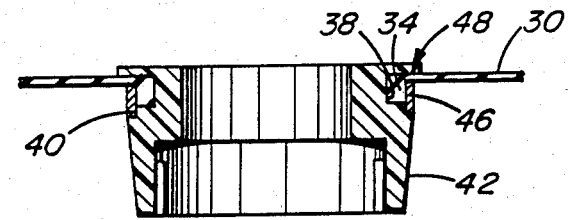
FIG. 5 is a view of the connecting system of FIGS. 3 and 4 fully assembled.

FIG. 5 illustrates the system completely installed. In this Figure, the keeper 46 has been forced over the tapered surface 42 which expands the keeper 46 circumferentially but within its elastic limit. After passing over the ledge 40 the keeper contracts to engage behind the ledge and to compress the boss 34 against the groove 38. The keeper 46 remains under the hoop stress to ensure a good circumferential seal between the boss 34 and the component 36. The keeper 46 also compresses the sheet material 30 against the side of the groove confronting the ledge 40 as illustrated at 48 in FIG. 5.

The installed system as illustrated in FIG. 5 provides a simple, easily installed connection between the component 36 and the sheet material 30. The joint produced is mechanically robust and leak proof.

While one embodiment of the present invention has been described in the foregoing, it is to be understood that other embodiments can be constructed within the terms of the invention. For example, it is possible to construct embodiments of the system in which the groove in the annular rigid component was internal. The annular keeper could be compressed as in passed over an internal tapered surface leading to the retaining ledge.

What is claimed is:

1. A system for connecting an annular, rigid component to an opening in a flexible sheet material, comprising:
    (a) a boss molded around the opening in the sheet material;
    (b) means defining an external groove around the component of substantially the same dimensions as the boss, to accommodate the boss with a snug fit;
    (c) an annular keeper with an internal diameter less than the external diameter of the boss to engage the boss circumferentially under hoop stress and to compress the boss radially against the component; and
    (d) a ledge on the component for engaging the annular keeper to retain the keeper in compressing relation on the boss.

2. A system according to claim 1, including an annular tapered surface on the component ending at the ledge.

3. A system according to claim 1, wherein the component is metal.

4. A system according to claim 3, wherein the keeper is metal.

5. A system according to claim 1, wherein the component is a plastic material.

* * * * *